United States Patent
Li

(10) Patent No.: US 10,911,430 B2
(45) Date of Patent: Feb. 2, 2021

(54) ACCOUNT LOGIN CONNECTION METHOD AND APPARATUS, AND STORAGE MEDIUM

(71) Applicant: TENCENT TECHNOLOGY (SHENZHEN) COMPANY LIMITED, Guangdong (CN)

(72) Inventor: Zhong Wei Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 145 days.

(21) Appl. No.: 16/009,350

(22) Filed: Jun. 15, 2018

(65) Prior Publication Data

US 2018/0295124 A1 Oct. 11, 2018

Related U.S. Application Data

(63) Continuation of application No. PCT/CN2017/091896, filed on Jul. 5, 2017.

(30) Foreign Application Priority Data

Jul. 7, 2016 (CN) .......................... 2016 1 0534116

(51) Int. Cl.
*H04L 29/06* (2006.01)
*H04L 12/58* (2006.01)
*H04W 84/12* (2009.01)

(52) U.S. Cl.
CPC .......... *H04L 63/0815* (2013.01); *H04L 51/04* (2013.01); *H04W 84/12* (2013.01)

(58) Field of Classification Search
CPC ..... H04L 63/0815; H04L 51/04; H04L 51/00; H04L 12/58; H04L 51/32; H04L 51/10;

(Continued)

(56) References Cited

U.S. PATENT DOCUMENTS

2012/0192258 A1* 7/2012 Spencer ................ H04W 12/06
726/7
2014/0136638 A1* 5/2014 Zhang .................... H04L 51/04
709/206

(Continued)

FOREIGN PATENT DOCUMENTS

CN 103237034 A 8/2013
CN 103281327 A 9/2013

(Continued)

OTHER PUBLICATIONS

International Search Report for PCT/CN2017/091896, dated Sep. 15, 2017.

(Continued)

*Primary Examiner* — Abu S Sholeman
(74) *Attorney, Agent, or Firm* — Sughrue Mion, PLLC

(57) ABSTRACT

An account login method and apparatus and a storage medium are provided. The method includes receiving, from a first terminal, a login request including an identifier of a target network to which the first terminal is connected. One or more instant messaging accounts logged into by using the target network are obtained, and a target instant messaging account is selected from the one or more instant messaging accounts. A login authorization request is pushed to a second terminal on the target network, the second terminal corresponding to the target instant messaging account that is selected. In response to receiving a login authorization instruction from the second terminal, login information including the target instant messaging account is transmitted to the first terminal.

20 Claims, 9 Drawing Sheets

(58) Field of Classification Search
CPC .... H04L 12/585; H04W 84/12; H04W 48/18; G06F 15/16; H04B 1/38
See application file for complete search history.

(56) References Cited

U.S. PATENT DOCUMENTS

| | | | |
|---|---|---|---|
| 2015/0296449 A1* | 10/2015 | Shu | H04B 1/38 455/435.3 |
| 2015/0351004 A1* | 12/2015 | Ko | H04W 48/10 455/411 |
| 2016/0050325 A1* | 2/2016 | Onitsuka | H04N 1/32122 358/403 |
| 2016/0119351 A1 | 4/2016 | Tamura | |
| 2016/0156632 A1* | 6/2016 | Rohleder | G06F 21/60 726/27 |
| 2017/0041966 A1* | 2/2017 | Asakura | H04N 1/00103 |
| 2018/0167371 A1* | 6/2018 | Gordon | H04L 63/0815 |
| 2019/0102123 A1* | 4/2019 | Inoue | G06F 3/1292 |

FOREIGN PATENT DOCUMENTS

| | | |
|---|---|---|
| CN | 104486747 A | 4/2015 |
| CN | 104506492 A | 4/2015 |
| CN | 105024986 A | 11/2015 |
| CN | 105407086 A | 3/2016 |
| CN | 106130881 A | 11/2016 |

OTHER PUBLICATIONS

Communication dated Mar. 15, 2019 from the State Intellectual Property Office of the P.R.C. in application No. 201610534116.2.
International Search Report and Translation of Written Opinion, dated Sep. 15, 2017 from the International Bureau in counterpart International application No. PCT/CN2017/091896.
Communication dated May 29, 2019 from the State Intellectual Property Office of the P.R.C. in application No. 201610534116.2.

* cited by examiner

ACCOUNT LOGIN CONNECTION METHOD AND APPARATUS, AND STORAGE MEDIUM

CROSS-REFERENCE TO RELATED APPLICATIONS

This application is a continuation of International Patent Application No. PCT/CN2017/091896, which is based on and claims priority from Chinese Patent Application No. 201610534116.2, filed in the Chinese Patent Office on Jul. 7, 2016, the disclosures of each of which are incorporated by reference herein in their entirety.

BACKGROUND

1. Field

This application relates to the field of communications technologies, and specifically, to an account login method and apparatus, and a storage medium.

2. Description of Related Art

With development of Internet technologies, there are more types of applications, such as various video applications and audio applications, on terminals. Usually, to enable data synchronization and record various operations of a user, it is usually needed to log in to an instant messaging account on a terminal. For example, if a user watches a video by using a specific network video application on a digital television terminal, and hopes to collect the video or share it with others, the user may choose to log in to an instant messaging account thereof on the digital television terminal, so as to perform a collection or sharing operation. However, in the existing technology, when a terminal logs in to an instant messaging account, it is needed to input an account password on the terminal to log in, or the terminal displays a login two-dimensional code, a user scans the login two-dimensional code to complete input and authorize login. Steps of such a login manner are extremely complex.

SUMMARY

It is an aspect to provide an account login method and apparatus, and a storage medium, so as to shorten and simplify a login process of an instant messaging account on a same target network as a terminal on the terminal, thereby implementing rapid login and improving a login rate.

According to an aspect of one or more exemplary embodiments, there is provided a method. The account login method includes receiving, from a first terminal, a login request including an identifier of a target network to which the first terminal is connected. One or more instant messaging accounts logged into by using the target network are obtained, and a target instant messaging account is selected from the one or more instant messaging accounts. A login authorization request is pushed to a second terminal on the target network, the second terminal corresponding to the target instant messaging account that is selected. In response to receiving a login authorization instruction from the second terminal, login information including the target instant messaging account is transmitted to the first terminal.

According to other aspects of one or more exemplary embodiments, there is also provided an apparatus and a computer readable storage medium consistent with the method.

BRIEF DESCRIPTION OF THE DRAWINGS

Exemplary embodiments will now be described with reference to the accompanying drawings, in which.

DETAILED DESCRIPTION

The following clearly and completely describes the technical solutions in the exemplary embodiments of this application with reference to the accompanying drawings in the exemplary embodiments of this application are shown. The described exemplary embodiments are some exemplary embodiments of this application rather than all of the exemplary embodiments. All other exemplary embodiments obtained by a person of ordinary skill in the art based on the exemplary embodiments of this application without creative efforts shall fall within the protection scope of this application and the appended claims.

In exemplary embodiments of this application, a login request sent by a first terminal is received, where the login request includes an identifier of a target network to which the first terminal is connected. At least one instant messaging account logged in to by using the target network is obtained, and a login authorization request is pushed to a second terminal corresponding to the target instant messaging account in the at least one instant messaging account. If a login authorization instruction fed back by the second terminal for the login authorization request is received, login information is sent to the first terminal, where the login information includes the target instant messaging account, to enable the first terminal to perform account login by using the target instant messaging account. Such a manner may shorten and simplify a login process of an instant messaging account on a same target network as the first terminal on the first terminal, thereby implementing rapid login and improving a login rate.

Figure 1:
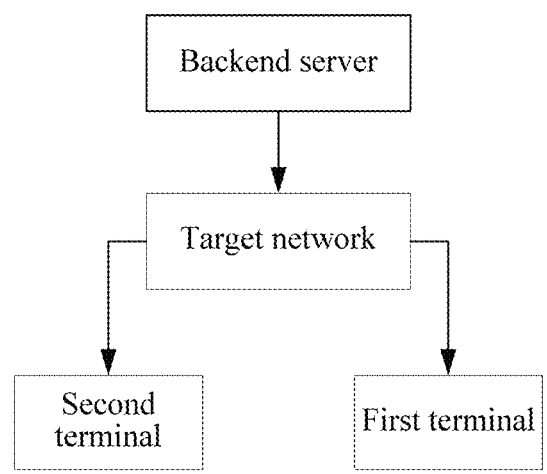
FIG. 1 is a diagram of a system architecture according to an exemplary embodiment of this application.

Referring to FIG. 1, FIG. 1 is a diagram of a system architecture according to an exemplary embodiment of this application. As shown in the figure, the system architecture includes a backend server, a first terminal on a same target network, and a second terminal corresponding to an instant messaging account. The first terminal may include any one of a digital television terminal, a smartphone, a personal computer, and a tablet computer. Various applications, such as various video applications and audio applications, on may be installed on the first terminal. The second terminal may include a smartphone, a personal computer, a tablet computer, and the like. Various instant messaging applications may be installed on the second terminal. A user may log in to an instant messaging account on an instant messaging application of the second terminal.

The target network may be a wireless local area network such as a wireless fidelity (WiFi) network. The first terminal and the second terminal may be located on a same WiFi network. Being located on a same WiFi network means that the first terminal and the second terminal are connected to the Internet through an access device of the same wireless local area network. The access device may be a router, a switch, or the like.

In some exemplary embodiments, being located on a same WiFi network may alternatively mean that the first terminal and the second terminal are terminals at a same WiFi hotspot. Both of the first terminal and the second terminal are connected to the Internet through the WiFi hotspot, and the WiFi hotspot may be a smartphone.

It should be understood that, in some exemplary embodiments, the target network may alternatively be a wired local area network, and both of the first terminal and the second terminal are located on a same wired local area network, and are connected to the Internet through an access device of the same wired local area network.

The account login method of this exemplary embodiment of this application mainly aims at implementing rapid login of an instant messaging account on a first terminal. A specific solution is that a backend server obtains an identifier of a target network to which the first terminal is connected, obtains an instant messaging account logged in to by using the target network, that is, detecting an instant messaging account using a same target network as that of the first terminal, and sends a login authorization request to a second terminal corresponding to the instant messaging account; if a user allows the instant messaging account to be logged in to on the first terminal, a login authorization instruction may be fed back to the backend server by means of an interaction operation on the second terminal; and if the backend server receives the login authorization instruction, the backend server sends login information to the first terminal, where the login information includes the instant messaging account, and the first terminal may rapidly log in to the instant messaging account.

It should be noted that the first terminal and the second terminal in this exemplary embodiment of this application may be different terminals or a same terminal (that is, the user opens an audio/video application and an instant messaging application on the same terminal).

Figure 2A:
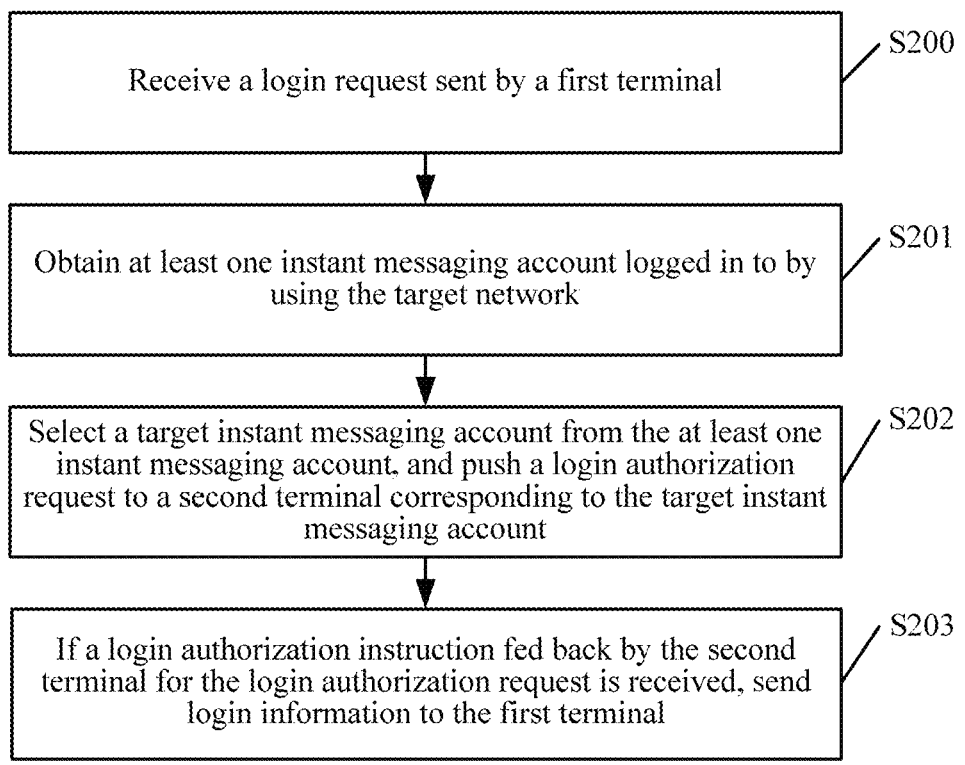
FIGS. 2A and 2B are flowcharts of an account login method according to exemplary embodiments of this application.
Figure 2B:
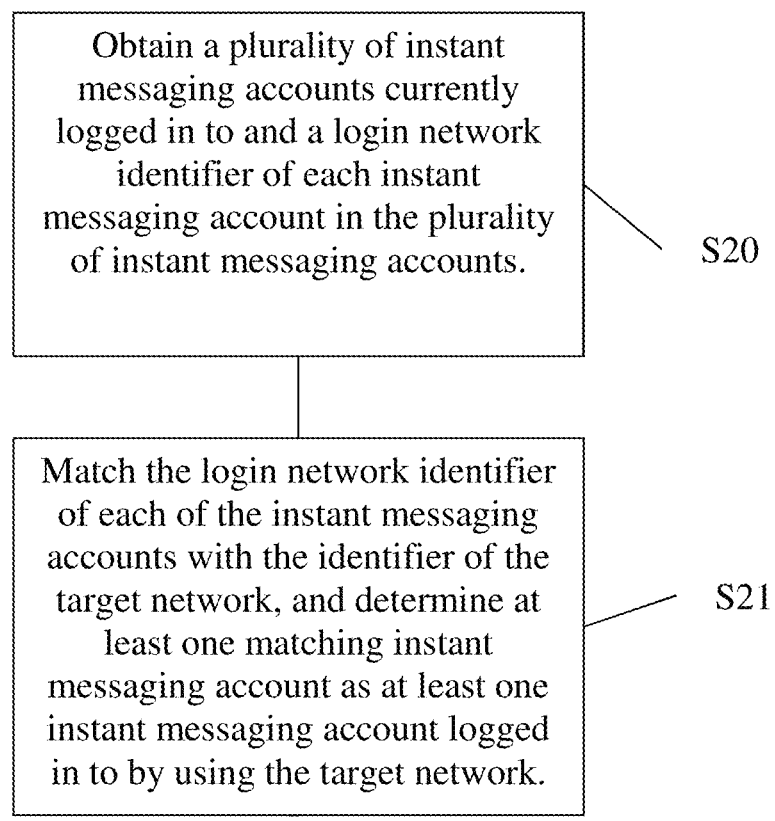
Figure 3:
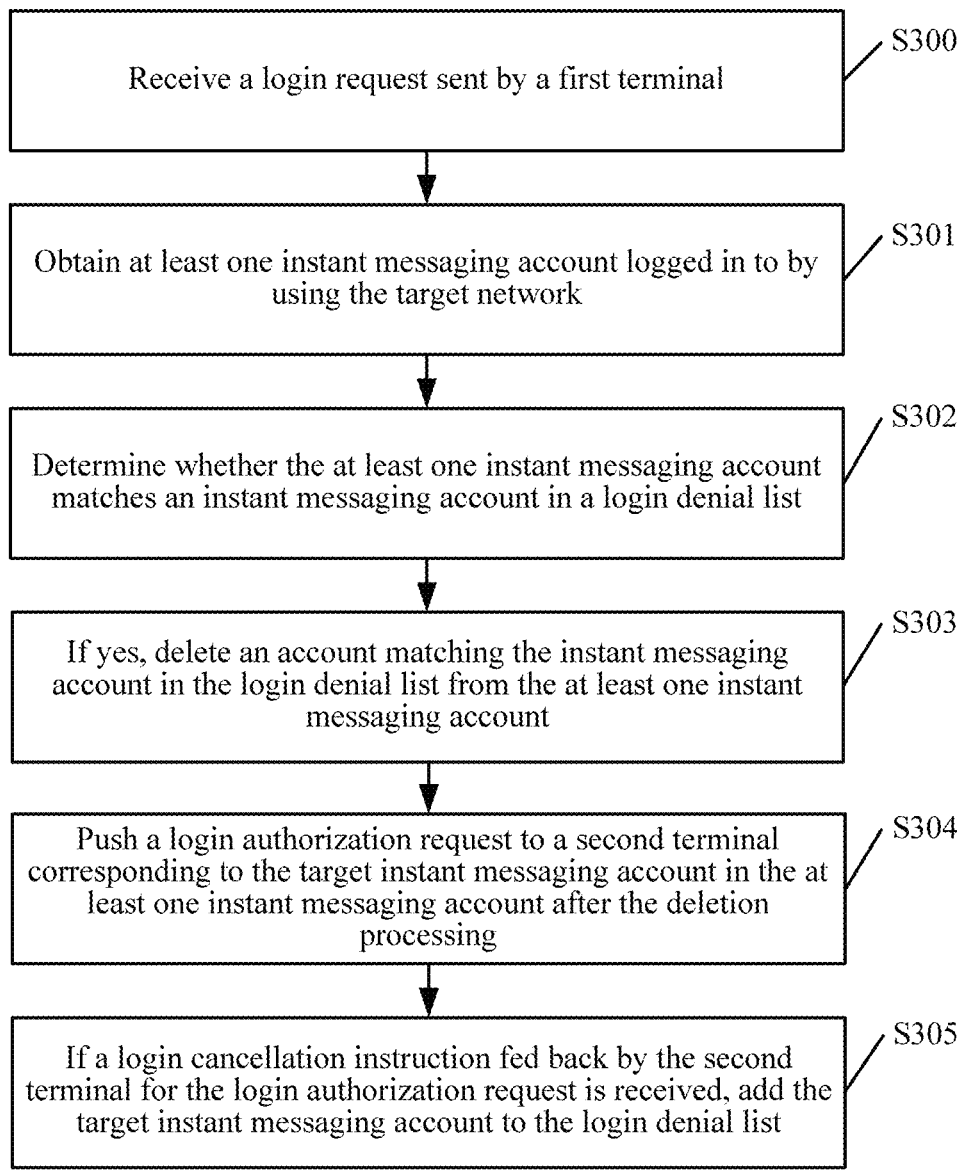
FIG. 3 is a flowchart of another account login method according to an exemplary embodiment of this application.
Figure 4:
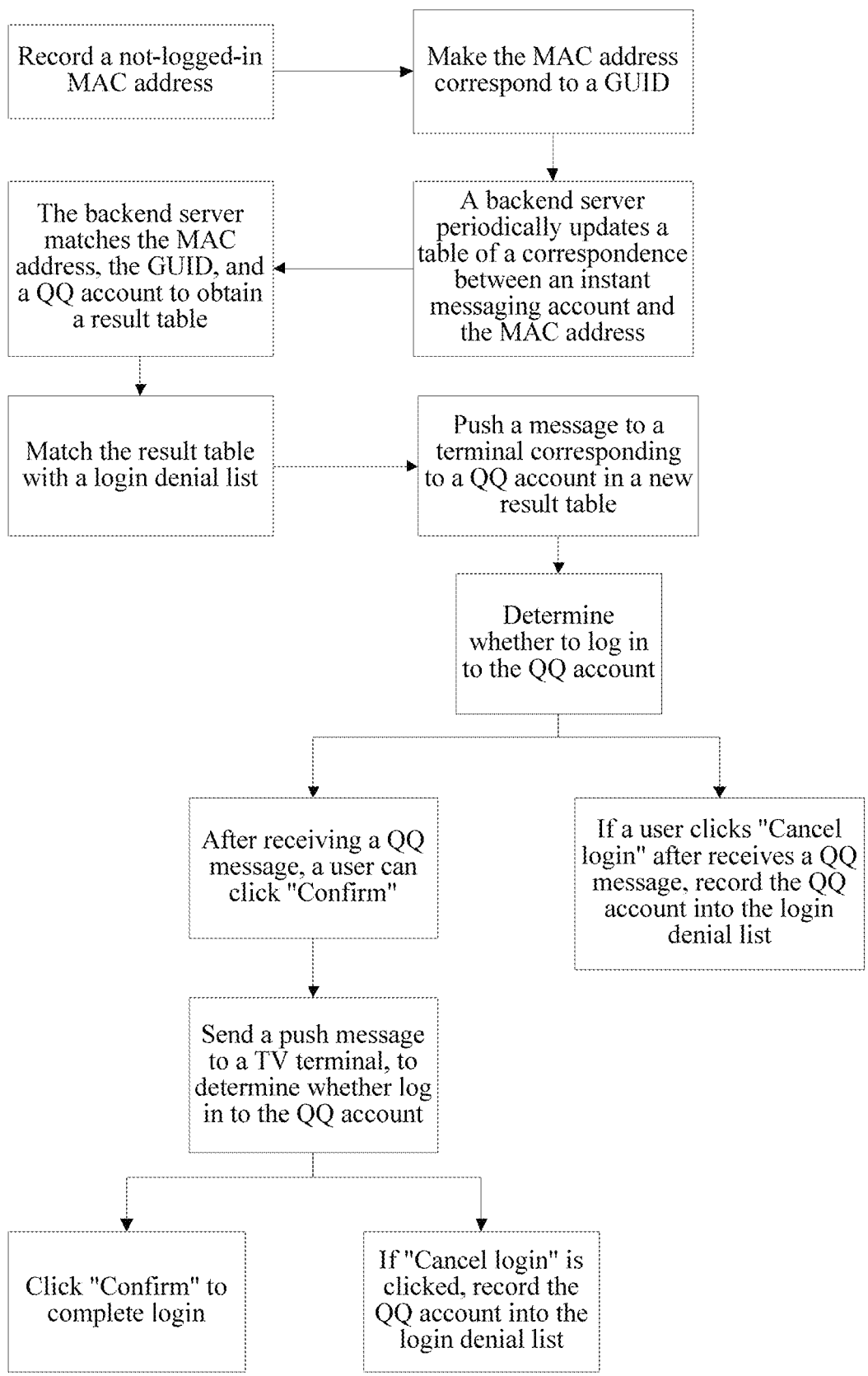
FIG. 4 is a flowchart of an account login according to an exemplary embodiment of this application.

The following describes the account login method according to the exemplary embodiments of this application in detail with reference to FIG. 2 to FIG. 4.

Referring to FIGS. 2A and 2B, FIGS. 2A and 2B are flowcharts of an account login method according to exemplary embodiments of this application. The method may include the following steps S200 to S203.

S200: Receive a login request sent by a first terminal, the login request including an identifier of a target network to which the first terminal is connected.

In this exemplary embodiment of this application, the first terminal may be a digital television terminal, a tablet computer, a personal computer, a smartphone, or the like. Various video applications or audio applications may be installed on the first terminal. When a user watches a video by using a video application on the first terminal or listens to audio by using an audio application on the first terminal, the user may perform various data synchronization operations, such as collecting a specific video, hoping to watch the collected video on any other devices, or the user may share a specific piece of audio with a friend. For the above, the user logs in to an instant messaging account on the first terminal to perform a data synchronization or sharing operation.

The user triggers the first terminal by means of an interaction operation on the first terminal to send a login request to the backend server. In this application, the interaction operation may be a touchscreen operation, a mouse operation, a remote control operation, or the like.

The login request includes an identifier of a target network to which the first terminal is connected. The target network may be a WiFi network, and the identifier of the target network may be a Media Access Control (MAC) address and/or an Internet Protocol (IP) address of an access device of the WiFi network.

Further in some exemplary embodiments, the login request may further include an identity (ID) of a video application or an audio application installed on the first terminal. The ID may be an ID allocated by a system to the application when the application of the first terminal is activated and logged in to for the first time. The ID is used for uniquely identifying the application of the first terminal. The backend server generates, according to a login request, a table of a correspondence between a MAC address+IP address and an ID.

It should be noted that, in some exemplary embodiments, the backend server may alternatively detect a user login state of the first terminal, and if the first terminal is in a not-logged-in state, obtain the identifier of the target network to which the first terminal is connected.

S201: Obtain at least one instant messaging account logged in to by using the target network.

In this exemplary embodiment of this application, the backend server obtains at least one instant messaging account logged in to by using the target network, that is, accessing the network by using a same network access device as that of the first terminal. For example, the first terminal and each instant messaging account may be on a same WiFi network. A specific obtaining manner may be periodically synchronizing each instant messaging account and an identifier of a login network of each instant messaging account with an instant messaging server. It should be noted that the instant messaging account may include various social application account such as, a QQ account, a WeChat account, a Weibo account, and the like.

In some exemplary embodiments, the obtaining at least one instant messaging account logged in to by using the target network, i.e., step S201, may include the following steps S20 and S21 as shown in FIG. 2B.

S20: Obtain a plurality of instant messaging accounts currently logged in to and a login network identifier of each instant messaging account in the plurality of instant messaging accounts.

In this exemplary embodiment of this application, the login network identifier of the instant messaging account may be an identifier of a network used when the instant messaging account is currently logged in to. Specifically, the backend server may periodically obtain a plurality of instant messaging accounts currently logged in to and a login network identifier of each instant messaging account in the plurality of instant messaging accounts. For example, the backend server periodically synchronizes a table of a correspondence between each instant messaging account currently logged in to and a MAC address+IP address of a WiFi network.

The periodical obtaining may be performing obtaining based on a preset period, and for example, may be performing obtaining once per hour, or performing obtaining once per day. Setting of a specific period may be performed according to an actual situation, and is not exhaustive in this application.

S21: Match the login network identifier of each of the instant messaging accounts with the identifier of the target network, and determine at least one matching instant messaging account as at least one instant messaging account logged in to by using the target network.

In this exemplary embodiment of this application, the backend server matches the login network identifier of each instant messaging account with the identifier of the target network, and determines at least one matching instant messaging account as an instant messaging account logged in to by using the target network.

Specifically in some exemplary embodiments, the backend server queries a table of correspondences between a plurality of instant messaging accounts and MAC addresses+IP addresses synchronized by an instant messaging server for a MAC address+IP address of the not-logged-in first terminal, matches the MAC address+IP address of the not-logged-in first terminal with the table, and returns a result table including a matching MAC address+IP address, an instant messaging account, and a Globally Unique Identifier (GUID). The at least one instant messaging account included the result table is an instant messaging account logged in to by using the target network.

S202: Select a target instant messaging account from the at least one instant messaging account, and push a login authorization request to a second terminal corresponding to the target instant messaging account.

In this exemplary embodiment of this application, the at least one instant messaging account may include only one instant messaging account (that is, the first terminal only logs in to one instant messaging account on a same WiFi network) or at least two instant messaging accounts. The following descriptions are provided respectively for two scenarios.

Scenario 1: If the at least one instant messaging account includes only one instant messaging account, the instant messaging account is a target instant messaging account, and a login authorization request is pushed to a second terminal corresponding to the target instant messaging account.

Scenario 2: If the at least one instant messaging account includes at least two instant messaging accounts, the at least two instant messaging accounts are both or all target instant messaging accounts, a login authorization request is pushed to at least two second terminals corresponding to both or all of the target instant messaging accounts.

Alternatively, in some exemplary embodiments, at least one target instant messaging account is determined from the at least two instant messaging accounts according to a preset processing rule, and a login authorization request is pushed to at least one second terminal corresponding to the determined at least one target instant messaging account.

It should be noted that the preset processing rule may include:

1. The backend server sends detected at least two instant messaging accounts logged in to on a same target network to the first terminal, the user selects a target instant messaging account to log in to on the first terminal, where a selection result is fed back to the backend server, and the backend server sends a login authorization request to a second terminal corresponding to the selected target instant messaging account.

2. The backend server obtains historical login data of each instant messaging account in the at least two instant messaging accounts on the first terminal, where the historical login data includes, but is not limited to, a login frequency, a login period, and the like, then determines, according to the historical login data of each instant messaging account on the first terminal, an instant messaging account having a highest login frequency, and determines the instant messaging account as a target instant messaging account; and/or may determine, according to the historical login data of each instant messaging account on the first terminal, an instant messaging account having a shortest login period, and determine the instant messaging account as a target instant messaging account.

A manner in which the backend server pushes the login authorization request to the second terminal corresponding to the target instant messaging account may be sending a push message to the second terminal, where content of the push message may be "It is detected that you are logged in on another terminal to watch television in a same WiFi environment, and if it is your operation, please click 'Confirm login'", and the user may choose to confirm a login operation on the second terminal or cancel the login operation on the second terminal.

In some exemplary embodiments, the pushing a login authorization request to a second terminal corresponding to the target instant messaging account in the at least one instant messaging account includes:

if the at least one instant messaging account includes at least two instant messaging accounts, selecting a target instant messaging account whose login time on the first terminal is closest to a current time from the at least two instant messaging accounts, and pushing a login authorization request to a second terminal corresponding to the target instant messaging account.

In this exemplary embodiment of this application, when selecting a target instant messaging account from the at least two instant messaging accounts, the backend server may select a target instant messaging account whose historical login time on the first terminal is closest to the current time and push a login authorization request to a second terminal corresponding to the target instant messaging account.

It should be noted that, in some exemplary embodiments, a timeout mechanism may be further set. When the second terminal still does not feed back whether to allow the target instant messaging account to be logged in to on the first terminal within a threshold time, an instant messaging account is further selected from an instant messaging account other than the foregoing instant messaging account in the at least one instant messaging account to push a login authorization request to a terminal corresponding to the selected instant messaging account.

S203: If a login authorization instruction fed back by the second terminal for the login authorization request is received, send login information to the first terminal, the login information including the target instant messaging account, to enable the first terminal to perform account login by using the target instant messaging account.

In this exemplary embodiment of this application, when the backend server receives a login authorization instruction fed back by the second terminal for the login authorization request, that is, a user of the target instant messaging account determines to log in to the target instant messaging account on the first terminal, the backend server sends login information to the first terminal, where the login information includes the target instant messaging account, to enable the first terminal to perform account login by using the target instant messaging account. After logging in to the target instant messaging account, the first terminal may perform operations such as audio/video sharing and collection.

An example in which the first terminal is a digital television terminal is used herein for description. After "Confirm" is clicked on the second terminal, the backend receives a confirm message and pushes a piece of login information to a TV terminal, to prompt the user that the target instant messaging account is to be logged in to on the TV terminal, and the user clicks "Confirm" to complete login.

In the exemplary embodiments of this application, a login request sent by a first terminal is received, where the login request includes an identifier of a target network to which the first terminal is connected. At least one instant messaging account logged in to by using the target network is obtained, and a login authorization request is pushed to a second terminal corresponding to the target instant messaging account in the at least one instant messaging account. If a login authorization instruction fed back by the second terminal for the login authorization request is received, login information is sent to the first terminal, where the login information includes the target instant messaging account, to enable the first terminal to perform account login by using the target instant messaging account. Such a manner may shorten and simplify a login process of an instant messaging account on a same target network as the first terminal on the first terminal, thereby implementing rapid login and improving a login rate.

Referring to FIG. 3, FIG. 3 is a flowchart of another account login method according to an exemplary embodiment of this application. The method may include the following steps S300 to S305.

S300: Receive a login request sent by a first terminal, the login request including an identifier of a target network to which the first terminal is connected.

S301: Obtain at least one instant messaging account logged in to by using the target network.

Refer to steps S200 to S201 in the exemplary embodiment of FIG. 2A for detailed description of steps S300 to S301 in this exemplary embodiment of this application. Details are not described herein again.

S302: Determine whether the at least one instant messaging account matches an instant messaging account in a login denial list, where the instant messaging account included in the login denial list may be an account whose login on the first terminal is preset to be denied.

In this exemplary embodiment of this application, after at least one instant messaging account logged in to by using the target network is obtained, it is further determined whether the at least one instant messaging account matches an instant messaging account in a login denial list. The instant messaging account included in the login denial list may be an account whose login on the first terminal is preset to be denied.

The instant messaging account included in the login denial list may be obtained by the backend server according to a user operation. For example, when the backend server pushes a login authorization request to a specific instant messaging account, if the instant messaging account returns a login cancellation instruction, the backend server adds the instant messaging account to the login denial list. In this way, an instant messaging account temporarily connected to the target network may be effectively filtered out.

It should be understood that, in some exemplary embodiments, when a specific instant messaging account returns a login cancellation instruction, statistical data of historical login of the instant messaging account on the first terminal may be further collected, where the statistical data includes, but is not limited to, at least one of the following: a number of times, a time length, and the like of accessing the first terminal. Whether to add the instant messaging account to the login denial list may be determined according to the statistical data. In this way, an accurate status of a login denial of a messaging account in the login denial list may be ensured.

Further in some exemplary embodiments, to reflect a login denial status more accurately by using an instant messaging account included in the login denial list, the first terminal in this exemplary embodiment of this application may further provide a user interface, so that the user may operate or modify the login denial list by using the interface, for example, adding an instant messaging account or deleting some instant messaging accounts from the login denial list.

S303: If yes, delete an account matching the instant messaging account in the login denial list from the at least one instant messaging account.

In this exemplary embodiment of this application, if the at least one instant messaging account includes an account matching an instant messaging account included in the login denial list, the matching account is deleted from the at least one instant messaging account that is, deleting the instant messaging account from a result table.

S304: Push a login authorization request to a second terminal corresponding to the target instant messaging account in the at least one instant messaging account after the deletion processing.

In this exemplary embodiment of this application, a target instant messaging account may be selected from the remaining at least one instant messaging account after the deletion processing, and a login authorization request is pushed to a second terminal corresponding to the target instant messaging account.

Specifically in some exemplary embodiments, the target instant messaging account may be one or more instant messaging accounts.

S305: If a login cancellation instruction fed back by the second terminal for the login authorization request is received, add the target instant messaging account to the login denial list.

In this exemplary embodiment of this application, if a login cancellation instruction fed back by the second terminal for the login authorization request is received, that is, the user does not allow the target instant messaging account to be logged in to on the first terminal, the target instant messaging account is added to the login denial list. In this way, a subsequently pushed push message would not be pushed to the target instant messaging account, to avoid bothering the user.

Further in some exemplary embodiments, when a login cancellation instruction fed back by the second terminal for the login authorization request is received, statistical data of historical login of the instant messaging account on the first terminal may be further collected, where the statistical data includes, but is not limited to, a number of times, a time length, and the like of accessing the first terminal. Whether to add the instant messaging account to the login denial list may be determined according to the statistical data. In this way, an accurate status of a login denial of a messaging account in the login denial list may be ensured.

In some exemplary embodiments, if a login authorization instruction fed back by the second terminal for the login authorization request is received, indicating that log in to the target instant messaging account on the first terminal is allowed, the backend server sends login information to the first terminal. The login information includes the target instant messaging account. For a specific solution, refer to step S203. Details are not described herein again.

In the exemplary embodiments of this application, a login request sent by a first terminal is received, where the login request includes an identifier of a target network to which the first terminal is connected. At least one instant messaging account logged in to by using the target network is obtained, and a login authorization request is pushed to a second terminal corresponding to the target instant messaging account in the at least one instant messaging account. If a login authorization instruction fed back by the second terminal for the login authorization request is received, login information is sent to the first terminal, where the login information includes the target instant messaging account, to enable the first terminal to perform account login by using the target instant messaging account. Such a manner may shorten and simplify a login process of an instant messaging account on a same target network as the first terminal on the first terminal, thereby implementing rapid login and improving a login rate.

Referring to FIG. 4, FIG. 4 is a flowchart of account login according to an exemplary embodiment of this application. As shown in the figure, in this exemplary embodiment, an example in which a first terminal is a TV terminal and a second terminal is a mobile phone is used for description. An account login process in this exemplary embodiment of this application includes:

recording, by a backend server, a MAC address of an access device of a WiFi network used by a not-logged-in TV terminal, and making the MAC address correspond to a GUID of an application installed on the TV terminal;

periodically updating, by the backend server, a table of a correspondence between an instant messaging account (such as, a QQ account) and a MAC address of an access device of a network used;

matching, by the backend server, a MAC address in a table of correspondences among the MAC address of the access device of the WiFi network used by the TV terminal, the GUID, and the QQ account, to obtain a matching result table, where the result table includes at least a QQ account;

matching the result table with a login denial list, performing query, and deleting a matching QQ account from the result table, to form a new result table;

pushing a message to a terminal corresponding to a QQ account in the new result table, to determine whether a user chooses to log in;

if the user clicks "Confirm" after receiving a QQ message, sending, by the backend server, a push message to the TV terminal, to determine whether to log in to the QQ account, if "Confirm" is clicked, completing the login, and if "Cancel login" is clicked, recording the QQ account into the login denial list; and if the user clicks "Cancel login" after receiving the QQ message, recording the QQ account into the login denial list.

Figure 5:
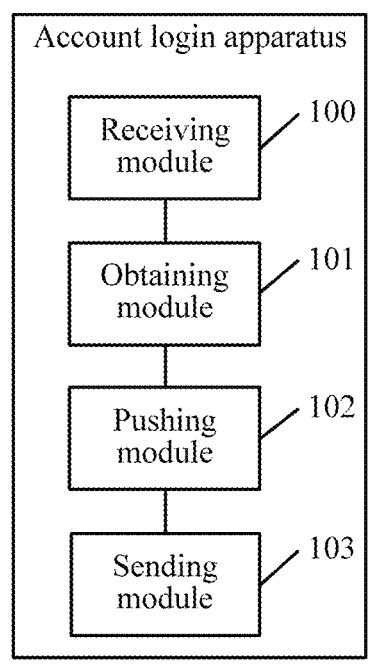
FIG. 5 is a schematic structural diagram of an account login apparatus according to an exemplary embodiment of this application.
Figure 6:
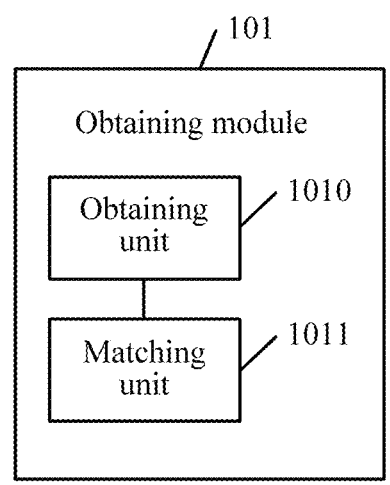
FIG. 6 is a schematic structural diagram of an obtaining module of the account login apparatus of FIG. 5, according to an exemplary embodiment of this application.
Figure 7:
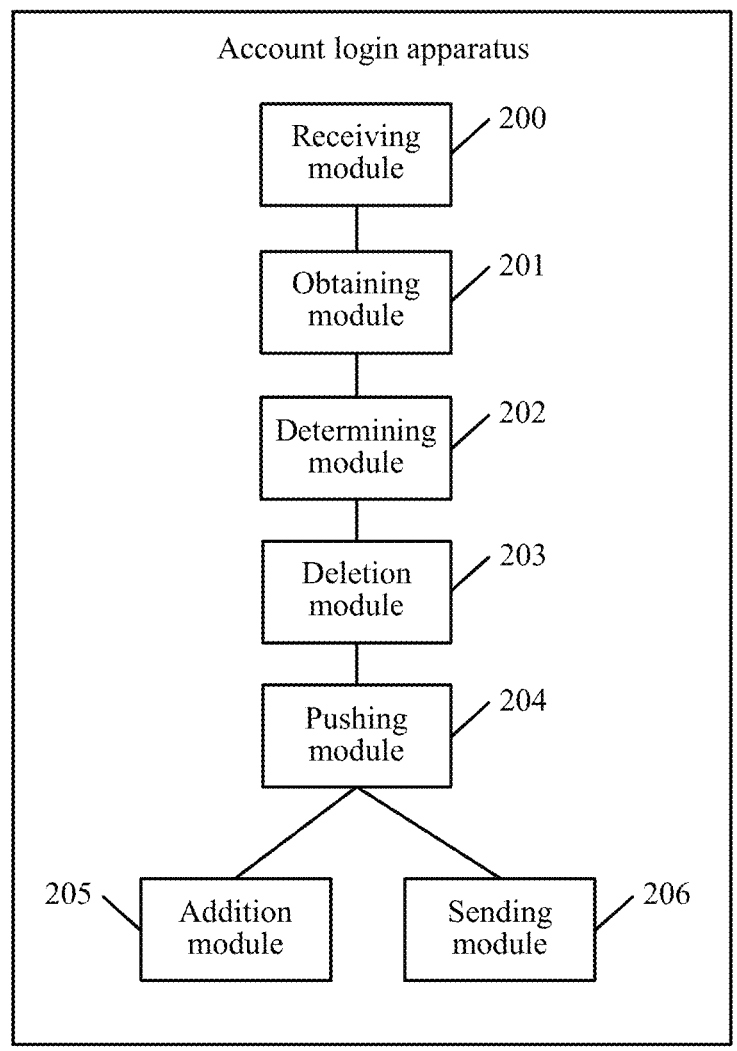
FIG. 7 is a schematic structural diagram of another account login apparatus according to an exemplary embodiment of this application.

The following describes an account login apparatus according to an exemplary embodiment of this application in detail with reference to FIG. 5 to FIG. 7.

Referring to FIG. 5, FIG. 5 is a schematic structural diagram of an account login apparatus according to an exemplary embodiment of this application. As shown in the figure, the account login apparatus includes a receiving module 100, an obtaining module 101, a pushing module 102, and a sending module 103.

The receiving module 100 is configured to receive a login request sent by a first terminal, the login request including an identifier of a target network to which the first terminal is connected.

In this exemplary embodiment of this application, the first terminal may be a digital television terminal, a tablet computer, a personal computer, a smartphone, or the like. Various video applications or audio applications may be installed on the first terminal. When a user watches a video by using a video application on the first terminal or listens to audio by using an audio application on the first terminal, the user performs various data synchronization operations, such as collecting a specific video, hoping to watch the collected video on any other devices, or the user may share a specific piece of audio with a friend. For the above, the user logs in to an instant messaging account on the first terminal to perform a data synchronization or sharing operation.

The user triggers the first terminal by means of an interaction operation on the first terminal to send a login request to the backend server. The interaction operation may be a touchscreen operation, a mouse operation, a remote control operation, or the like. The login request includes an identifier of a target network to which the first terminal is connected. The target network may be a WiFi network, and the identifier of the target network may be a MAC address and/or an IP address of an access device of the WiFi network. Further in some exemplary embodiments, the login request may further include an ID of a video application or an audio application installed on the first terminal. The ID may be an ID allocated by a system to the application when the application of the first terminal is activated and logged in to for the first time. The ID is used for uniquely identifying the application of the first terminal. The backend server generates, according to a login request, a table of a correspondence between a MAC address+IP address and an ID.

It should be noted that, in some exemplary embodiments, the backend server may alternatively detect a user login state of the first terminal, and if the first terminal is in a not-logged-in state, obtain the identifier of the target network to which the first terminal is connected.

The obtaining module 101 is configured to obtain at least one instant messaging account logged in to by using the target network.

In this exemplary embodiment of this application, the backend server obtains at least one instant messaging account logged in to by using the target network, that is, accessing the network by using a same network access device as that of the first terminal. For example, the first terminal and each instant messaging account are on a same WiFi network. A specific obtaining manner may be periodically synchronizing each instant messaging account and an identifier of a login network of each instant messaging account with an instant messaging server. It should be noted that the instant messaging account may include various social application account such as, a QQ account, a WeChat account, a Weibo account, and the like.

In some exemplary embodiments, referring to FIG. 6, FIG. 6 is a schematic structural diagram of an obtaining module according to an exemplary embodiment of this application. As shown in the figure, the obtaining module 101 includes an obtaining unit 1010 and a matching unit 1011.

The obtaining unit 1010 is configured to obtain a plurality of instant messaging accounts currently logged in to and a login network identifier of each instant messaging account in the plurality of instant messaging accounts.

In this exemplary embodiment of this application, the login network identifier of the instant messaging account may be an identifier of a network used when the instant messaging account is currently logged in to. The backend server periodically obtains a plurality of instant messaging accounts currently logged in to and a login network identifier of each instant messaging account in the plurality of instant messaging accounts. For example, the backend server periodically synchronizes a table of a correspondence between each instant messaging account currently logged in to and a MAC address+IP address of a WiFi network.

The matching unit 1011 is configured to match the login network identifier of each of the instant messaging accounts with the identifier of the target network, and determine at least one matching instant messaging account as at least one instant messaging account logged in to by using the target network.

In this exemplary embodiment of this application, the backend server matches the login network identifier of each instant messaging account with the identifier of the target network, and determines at least one matching instant messaging account as an instant messaging account logged in to by using the target network.

Specifically in some exemplary embodiments, the backend server may query a table of correspondences between a plurality of instant messaging accounts and MAC addresses+IP addresses synchronized by an instant messaging server for a MAC address+IP address of the not-logged-in first terminal, matches the MAC address+IP address of the not-logged-in first terminal with the table, and returns a result table including a matching MAC address+IP address, an instant messaging account, and a GUID. The at least one instant messaging account included the result table is an instant messaging account logged in to by using the target network.

Returning to FIG. 5, the pushing module 102 is configured to push a login authorization request to a second terminal corresponding to the target instant messaging account in the at least one instant messaging account.

In this exemplary embodiment of this application, the at least one instant messaging account may include only one instant messaging account (that is, the first terminal only logs in to one instant messaging account on a same WiFi network) or at least two instant messaging accounts.

If the at least one instant messaging account includes only one instant messaging account, the instant messaging account is a target instant messaging account, and a login authorization request is pushed to a second terminal corresponding to the target instant messaging account.

If the at least one instant messaging account includes at least two instant messaging accounts, the at least two instant messaging accounts are both or all target instant messaging accounts, a login authorization request is pushed to second terminals corresponding to both or all of the target instant messaging accounts. Alternatively, at least one target instant messaging account is determined from the at least two instant messaging accounts according to a preset processing rule, and a login authorization request is pushed to a second terminal corresponding to the determined at least one target instant messaging account. It should be noted that the preset processing rule may include: 1. the backend server sends detected at least two instant messaging accounts logged in to on a same target network to the first terminal, the user selects a target instant messaging account to log in to on the first terminal, where a selection result is fed back to the backend server, and the backend server sends a login authorization request to a second terminal corresponding to the selected target instant messaging account; 2. the backend server obtains historical login data of each instant messaging account in the at least two instant messaging accounts on the first terminal, where the historical login data includes, but is not limited to, a login frequency, a login period, and the like, then determines, according to the historical login data of each instant messaging account on the first terminal, an instant messaging account having a highest login frequency, and determines the instant messaging account as a target instant messaging account.

A manner in which the backend server pushes the login authorization request to the second terminal corresponding to the target instant messaging account may be sending a push message to the second terminal, where content of the push message may be "It is detected that you are logged in on another terminal to watch television in a same WiFi environment, and if it is your operation, please click 'Confirm login'", and the user may choose to confirm a login operation on the second terminal or cancel the login operation on the second terminal.

In some exemplary embodiments, the pushing module 102 may be specifically configured to: if the at least one instant messaging account includes at least two instant messaging accounts, select a target instant messaging account whose login time on the first terminal is closest to a current time from the at least two instant messaging accounts, and push a login authorization request to a second terminal corresponding to the target instant messaging account.

In this exemplary embodiment of this application, when selecting a target instant messaging account from the at least two instant messaging accounts, the backend server may select a target instant messaging account whose historical login time on the first terminal is closest to the current time and push a login authorization request to a second terminal corresponding to the target instant messaging account.

It should be noted that, in some exemplary embodiments, a timeout mechanism may be further set. When the second terminal still does not feed back whether to allow the target instant messaging account to be logged in to on the first terminal within a threshold time, an instant messaging account is further selected from an instant messaging account other than the foregoing instant messaging account in the at least one instant messaging account to push a login authorization request to a terminal corresponding to the selected instant messaging account.

The sending module 103 is configured to, if a login authorization instruction fed back by the second terminal for the login authorization request is received, send login information to the first terminal, the login information including the target instant messaging account, to enable the first terminal to perform account login by using the target instant messaging account.

In this exemplary embodiment of this application, when the backend server receives a login authorization instruction fed back by the second terminal for the login authorization request, that is, a user of the target instant messaging account determines to log in to the target instant messaging account on the first terminal, the backend server sends login information to the first terminal, where the login information includes the target instant messaging account, to enable the first terminal to perform account login by using the target instant messaging account. After logging in to the target instant messaging account, the first terminal may perform operations such as audio/video sharing and collection.

An example in which the first terminal is a digital television terminal is used herein for description. After "Confirm" is clicked on the second terminal, the backend receives a confirm message and then, pushes a piece of login information to a TV terminal, to prompt the user that the target instant messaging account is to be logged in to on the TV terminal, and the user clicks "Confirm" to complete login.

In the exemplary embodiments of this application, a login request sent by a first terminal is received, where the login request includes an identifier of a target network to which the first terminal is connected. At least one instant messaging account logged in to by using the target network is obtained, and a login authorization request is pushed to a second terminal corresponding to the target instant messaging account in the at least one instant messaging account. If a login authorization instruction fed back by the second terminal for the login authorization request is received, login information is sent to the first terminal, where the login information includes the target instant messaging account, to enable the first terminal to perform account login by using the target instant messaging account. Such a manner may shorten and simplify a login process of an instant messaging account on a same target network as the first terminal on the first terminal, thereby implementing rapid login and improving a login rate.

Referring to FIG. 7, FIG. 7 is a schematic structural diagram of another account login apparatus according to an exemplary embodiment of this application. As shown in the figure, the account login apparatus in this exemplary embodiment of this application includes a receiving module 200, an obtaining module 201, a determining module 202, a deletion module 203, a pushing module 204, an addition module 205, and a sending module 20. Refer to the detailed descriptions in the exemplary embodiment of FIG. 6 for the receiving module 200, the obtaining module 201, and the sending module 206. Details are not described herein again.

The determining module 202 is configured to determine whether the at least one instant messaging account matches an instant messaging account in a login denial list, where the instant messaging account included in the login denial list may be an account whose login on the first terminal is preset to be denied.

In this exemplary embodiment of this application, after at least one instant messaging account logged in to by using the target network is obtained, it is further determined whether the at least one instant messaging account matches an instant messaging account in a login denial list. The instant messaging account included in the login denial list may be an account whose login on the first terminal is preset to be denied.

The instant messaging account included in the login denial list may be obtained by the backend server according to a user operation. For example, when the backend server pushes a login authorization request to a specific instant messaging account, if the instant messaging account returns a login cancellation instruction, the backend server adds the instant messaging account to the login denial list. In this way, an instant messaging account temporarily connected to the target network may be effectively filtered out.

It should be understood that when a specific instant messaging account returns a login cancellation instruction, statistical data of historical login of the instant messaging account on the first terminal may be further collected, where the statistical data includes, but is not limited to, a number of times, a time length, and the like of accessing the first terminal. Whether to add the instant messaging account to the login denial list may be determined according to the statistical data. In this way, an accurate status of a login denial of a messaging account in the login denial list may be ensured.

Further in some exemplary embodiments, to reflect a login denial status more accurately by using an instant messaging account included in the login denial list, the first terminal in this exemplary embodiment of this application may further provide a user interface, so that the user may operate or modify the login denial list by using the interface, for example, adding an instant messaging account or deleting some instant messaging accounts from the login denial list.

The deletion module 203 is configured to, if the at least one instant messaging account matches an instant messaging account in a login denial list, delete an account matching the instant messaging account in the login denial list from the at least one instant messaging account.

In this exemplary embodiment of this application, if the at least one instant messaging account includes an account matching an instant messaging account included in the login denial list, the matching account is deleted from the at least one instant messaging account that is, deleting the instant messaging account from a result table.

The pushing module 204 is specifically configured to push a login authorization request to a second terminal corresponding to the target instant messaging account in the at least one instant messaging account after the deletion processing.

In this exemplary embodiment of this application, a login authorization request is pushed to a second terminal corresponding to the target instant messaging account in the at least one instant messaging account after the deletion processing. Specifically in some exemplary embodiments, the target instant messaging account may be one or more instant messaging accounts.

The addition module 205 is configured to, if a login cancellation instruction fed back by the second terminal for the login authorization request is received, add the target instant messaging account to the login denial list.

In this exemplary embodiment of this application, if a login cancellation instruction fed back by the second terminal for the login authorization request is received, that is, the user does not allow the target instant messaging account to be logged in to on the first terminal, the target instant messaging account is added to the login denial list. In this way, a subsequent push message would not be pushed to the target instant messaging account, to avoid bothering the user.

Further in some exemplary embodiments, when a login cancellation instruction fed back by the second terminal for the login authorization request is received, statistical data of historical login of the instant messaging account on the first terminal may be further collected, where the statistical data includes, but is not limited to, a number of times, a time length, and the like of accessing the first terminal. Whether to add the instant messaging account to the login denial list may be determined according to the statistical data. In this way, an accurate status of a login denial of a messaging account in the login denial list may be ensured.

In some exemplary embodiments, if a login authorization instruction fed back by the second terminal for the login authorization request is received, indicating that log in to the target instant messaging account on the first terminal is allowed, the backend server sends login information to the first terminal. The login information includes the target instant messaging account. For a specific solution, refer to step S203. Details are not described herein again.

In the exemplary embodiments of this application, a login request sent by a first terminal is received, where the login request includes an identifier of a target network to which the first terminal is connected. At least one instant messaging account logged in to by using the target network is obtained, and a login authorization request is pushed to a second terminal corresponding to the target instant messaging account in the at least one instant messaging account. If a login authorization instruction fed back by the second terminal for the login authorization request is received, login information is sent to the first terminal, where the login information includes the target instant messaging account, to enable the first terminal to perform account login by using the target instant messaging account. Such a manner may shorten and simplify a login process of an instant messaging account on a same target network as the first terminal on the first terminal, thereby implementing rapid login and improving a login rate.

Figure 8:
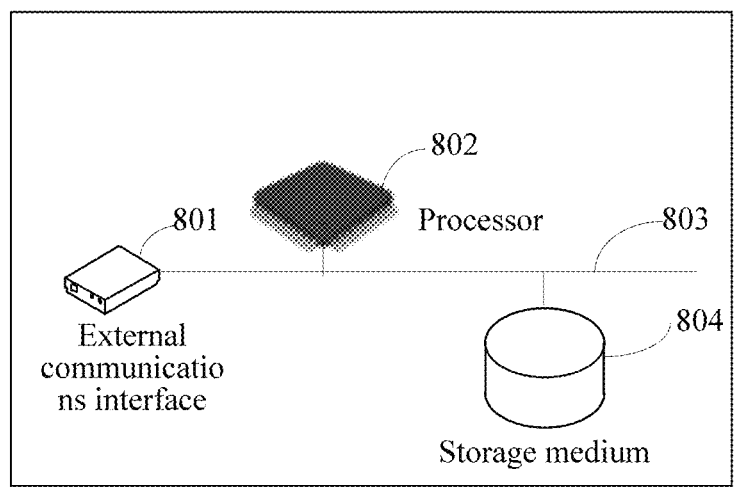
FIG. 8 is a schematic structural diagram of hardware configuration according to an exemplary embodiment of this application.

This application is based on specific hardware provided in the foregoing exemplary embodiment. As shown in FIG. 8, the apparatus may include a processor 802, a storage medium 804, and at least one external communications interface 801. The processor 802, the storage medium 804, and the external communications interface 801 are connected to each other by using a bus 803. The processor 802 may be an electronic component having a processing function, for example, a microprocessor, a central processing unit, a digital signal processor, or a programmable logic array. The storage medium 804 stores computer executable code.

The storage medium includes a group of instructions, the instructions, when being executed, causing at least one processor to perform the following operations:
  receiving a login request sent by a first terminal, the login request including an identifier of a target network to which the first terminal is connected;
  obtaining at least one instant messaging account logged in to by using the target network;
  selecting a target instant messaging account from the at least one instant messaging account, and pushing a login authorization request to a second terminal corresponding to the target instant messaging account; and
  if a login authorization instruction fed back by the second terminal for the login authorization request is received, sending login information to the first terminal, the login information including the target instant messaging account, to enable the first terminal to perform account login by using the target instant messaging account.

It should be noted that, in some exemplary embodiments, the storage medium in this application may further perform processing in the foregoing method procedures. However, details are not described herein again.

In addition, an account login apparatus provided in this application may further include:
  a memory, configured to store an executable program; and
  a processor, configured to implement, by executing the executable program stored in the memory, the following operations:
  receiving a login request sent by a first terminal, the login request including an identifier of a target network to which the first terminal is connected;
  obtaining at least one instant messaging account logged in to by using the target network;
  selecting a target instant messaging account from the at least one instant messaging account, and pushing a login authorization request to a second terminal corresponding to the target instant messaging account; and
  if a login authorization instruction fed back by the second terminal for the login authorization request is received, sending login information to the first terminal, the login information including the target instant messaging account, to enable the first terminal to perform account login by using the target instant messaging account.

It should be noted that, in some exemplary embodiments, the processor in this application may further perform processing in the foregoing method procedures. However, details are not described herein again.

A person of ordinary skill in the art may understand that all or some of the procedures in the method of the foregoing exemplary embodiments may be implemented by a computer program instructing relevant hardware. The program may be stored in a computer readable storage medium. The program corresponding to the account login apparatus shown in FIG. 5 to FIG. 7 may be stored in a storage medium of a server, and is executed by at least one processor in the server, to implement the foregoing account login method. The method includes the procedures in the method exemplary embodiments in FIG. 2 to FIG. 4. The foregoing storage medium may be: a magnetic disk, an optical disc, a read-only memory (ROM), a Random Access Memory (RAM), or the like.

What is disclosed above is merely some exemplary embodiments of this application, and certainly is not intended to limit the scopes of the claims of this application. Therefore, equivalent variations made in accordance with the claims of this application shall fall within the scope of this application and the appended claims.

What is claimed is:

1. A method comprising:
  receiving, by at least one processor from a first terminal, a login request comprising an identifier of a target network to which the first terminal is connected;
  obtaining, by the at least one processor, at least one instant messaging account logged into by using the target network;
  selecting, by the at least one processor, a target instant messaging account from the at least one instant messaging account;
  pushing, by the at least one processor to a second terminal on the target network, a login authorization request for authorizing a login by the first terminal, the second terminal corresponding to the target instant messaging account that is selected; and
  in response to receiving, from the second terminal, a login authorization instruction allowing the login, transmitting, by the at least one processor to the first terminal, login information to enable the first terminal to perform the login using the target instant messaging account.

2. The method according to claim 1, wherein the first terminal comprises one of a digital television terminal, a smartphone, a personal computer, and a tablet computer.

3. The method according to claim 1, wherein the obtaining comprises:
  obtaining, by the at least one processor, one or more instant messaging accounts currently logged in to the target network, and a login network identifier of each instant messaging account that is obtained; and
  matching, by the at least one processor, the login network identifier of each of the instant messaging accounts with the identifier of the target network, and determining at least one matching instant messaging account as the at least one instant messaging account logged in to the target network.

4. The method according to claim 1, wherein before pushing the login authorization request, the method further comprises:
determining, by the at least one processor, whether the at least one instant messaging account matches an instant messaging account in a login denial list, wherein the login denial list includes one or more accounts whose login on the first terminal is to be denied; and
in response to determining a match, deleting, by the at least one processor, an account matching the instant messaging account in the login denial list from the at least one instant messaging account; and
the pushing the login authorization request comprises:
selecting, by the at least one processor, a target instant messaging account from remaining at least one instant messaging account after the deleting the account, and pushing a login authorization request to a second terminal corresponding to the target instant messaging account.

5. The method according to claim 4, further comprising:
in response to receiving, from the second terminal, a login cancellation instruction corresponding to the login authorization request, adding, by the at least one processor, the target instant messaging account to the login denial list.

6. The method according to claim 1, wherein the pushing the login authorization request comprises:
if the at least one instant messaging account comprises at least two instant messaging accounts, selecting, by the at least one processor, a target instant messaging account whose login time on the first terminal is closest to a current time from the at least two instant messaging accounts, and pushing, by the at least one processor, a login authorization request to a second terminal corresponding to the target instant messaging account.

7. The method according to claim 1, wherein the target network comprises a wireless local area network; and
the identifier of the target network comprises a Media Access Control (MAC) address of an access device of the wireless local area network and/or an Internet Protocol (IP) address of the access device of the wireless local area network.

8. An apparatus comprising:
at least one memory configured to store computer program code; and
at least one processor configured to access the at least one memory and operate according to the computer program code, the computer program code including:
receiving code configured to cause the at least one processor to receive, from a first terminal, a login request comprising an identifier of a target network to which the first terminal is connected;
obtaining code configured to cause the at least one processor to obtain at least one instant messaging account logged into by using the target network;
selecting code configured to cause the at least one processor to select a target instant messaging account from the at least one instant messaging account;
pushing code configured to cause the at least one processor to push, to a second terminal on the target network, a login authorization request for authorizing a login by the first terminal, the second terminal corresponding to the target instant messaging account that is selected; and
sending code configured to cause the at least one processor to, in response to a login authorization instruction allowing the login being received from the second terminal, transmit, to the first terminal, login information to enable the first terminal to perform the login using the target instant messaging account.

9. The apparatus according to claim 8, wherein the first terminal comprises one of a digital television terminal, a smartphone, a personal computer, and a tablet computer.

10. The apparatus according to claim 8, wherein the obtaining code comprises:
an obtaining code configured to cause the at least one processor to obtain one or more instant messaging accounts currently logged in to the target network, and a login network identifier of each instant messaging account that is obtained; and
a matching code configured to cause the at least one processor to match the login network identifier of each of the instant messaging accounts with the identifier of the target network, and determine at least one matching instant messaging account as at least one instant messaging account logged in to the target network.

11. The apparatus according to claim 8, further comprising:
a determining code configured to cause the at least one processor to determine whether the at least one instant messaging account matches an instant messaging account in a login denial list, wherein the login denial list includes one or more accounts whose login on the first terminal is to be denied; and
a deletion code configured to cause the at least one processor to, in response to determining a match, delete an account matching the instant messaging account in the login denial list from the at least one instant messaging account, wherein
the pushing code is configured to cause the at least one processor to select a target instant messaging account from remaining at least one instant messaging account after the account is deleted, and push a login authorization request to a second terminal corresponding to the target instant messaging account.

12. The apparatus according to claim 11, further comprising:
an addition code configured to cause the at least one processor to, in response to receiving, from the second terminal, a login cancellation instruction corresponding to the login authorization request, add the target instant messaging account to the login denial list.

13. The apparatus according to claim 8, wherein if the at least one instant messaging account comprises at least two instant messaging accounts, the pushing code is configured to cause the at least one processor to select a target instant messaging account whose login time on the first terminal is closest to a current time from the at least two instant messaging accounts, and push a login authorization request to a second terminal corresponding to the target instant messaging account.

14. The apparatus according to claim 8, wherein the target network comprises a wireless local area network; and
the identifier of the target network comprises a Media Access Control (MAC) address of an access device of the wireless local area network and/or an Internet Protocol (IP) address of the access device of the wireless local area network.

15. A non-transitory computer readable storage medium storing computer program code which, when executed by at least one processor, causes the processor to execute operations comprising:

receiving, from a first terminal, a login request comprising an identifier of a target network to which the first terminal is connected;

obtaining at least one instant messaging account logged into by using the target network;

selecting a target instant messaging account from the at least one instant messaging account;

pushing a login authorization request for authorizing a login by the first terminal to a second terminal that corresponds to an instant messaging account that is logged into by using the target network; and in response to receiving, from the second terminal, a login authorization instruction to allow the login, transmitting, to the first terminal, login information to enable the first terminal to perform the login using the instant messaging account.

16. The method according to claim 15, wherein the first terminal comprises one of a digital television terminal, a smartphone, a personal computer, and a tablet computer, wherein the target network comprises a wireless local area network; and wherein the identifier of the target network comprises a Media Access Control (MAC) address of an access device of the wireless local area network and/or an Internet Protocol (IP) address of the access device of the wireless local area network.

17. The method according to claim 15, wherein the obtaining comprises:

obtaining, by the at least one processor, one or more instant messaging accounts currently logged in to the target network, and a login network identifier of each instant messaging account that is obtained; and matching, by the at least one processor, the login network identifier of each of the instant messaging accounts with the identifier of the target network, and determining at least one matching instant messaging account as the at least one instant messaging account logged in to the target network.

18. The method according to claim 15, wherein before pushing the login authorization request, the method further comprises:

determining, by the at least one processor, whether the at least one instant messaging account matches an instant messaging account in a login denial list, wherein the login denial list includes one or more accounts whose login on the first terminal is to be denied; and in response to determining a match, deleting, by the at least one processor, an account matching the instant messaging account in the login denial list from the at least one instant messaging account; and the pushing the login authorization request comprises:

selecting, by the at least one processor, a target instant messaging account from remaining at least one instant messaging account after the deleting the account, and pushing a login authorization request to a second terminal corresponding to the target instant messaging account.

19. The method according to claim 18, further comprising:

in response to receiving, from the second terminal, a login cancellation instruction corresponding to the login authorization request, adding, by the at least one processor, the target instant messaging account to the login denial list.

20. The method according to claim 15, wherein the pushing the login authorization request comprises:

if the at least one instant messaging account comprises at least two instant messaging accounts, selecting, by the at least one processor, a target instant messaging account whose login time on the first terminal is closest to a current time from the at least two instant messaging accounts, and pushing, by the at least one processor, a login authorization request to a second terminal corresponding to the target instant messaging account.

\* \* \* \* \*